US011250131B2

(12) United States Patent
Ren et al.

(10) Patent No.: US 11,250,131 B2
(45) Date of Patent: Feb. 15, 2022

(54) MULTI-PURPOSE AGENT FOR ENDPOINT SCANNING (71) Applicant: Beijing DiDi Infinity Technology and Development Co., Ltd., Beijing (CN)

(72) Inventors: Liwei Ren, San Jose, CA (US); Jing Chen, Palo Alto, CA (US)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 131 days.

(21) Appl. No.: 16/720,245

(22) Filed: Dec. 19, 2019

(65) Prior Publication Data
US 2021/0192047 A1 Jun. 24, 2021

(51) Int. Cl.
*G06F 21/56* (2013.01)

(52) U.S. Cl.
CPC .......... *G06F 21/565* (2013.01); *G06F 21/564* (2013.01); *G06F 2221/033* (2013.01)

(58) Field of Classification Search
CPC . G06F 21/565; G06F 21/564; G06F 2221/033
See application file for complete search history.

(56) References Cited

U.S. PATENT DOCUMENTS

| 7,260,558 | B1 | 8/2007 | Cheng et al. |
| 7,950,062 | B1 | 5/2011 | Ren et al. |
| 2005/0251509 | A1 | 11/2005 | Pontius |
| 2009/0006079 | A1 | 1/2009 | Van Caldwell et al. |
| 2010/0050177 | A1 | 2/2010 | Goyal et al. |
| 2013/0080398 | A1 | 3/2013 | Booth et al. |
| 2015/0106922 | A1 | 4/2015 | Zhao et al. |
| 2015/0154398 | A1 | 6/2015 | Jones et al. |
| 2015/0186649 | A1* | 7/2015 | Humble ............... G06F 21/564 726/23 |
| 2016/0299934 | A1 | 10/2016 | Karandikar et al. |
| 2017/0017561 | A1 | 1/2017 | Zhang et al. |

(Continued)

FOREIGN PATENT DOCUMENTS

| CN | 102693397 A | 9/2012 |
| CN | 104680064 A | 6/2015 |

(Continued)

OTHER PUBLICATIONS

Wikipedia, Electronic Discovery, accessed online at https://en.wikipedia.org/wiki/Electronic_discovery, on Dec. 18, 2020 (9 pages).

(Continued)

*Primary Examiner* — Ashokkumar B Patel
*Assistant Examiner* — William B Jones
(74) *Attorney, Agent, or Firm* — Sheppard Mullin Richter & Hampton LLP (57) ABSTRACT

Methods, apparatuses, and storage media storing instructions for scanning electronically-stored files are provided. A file stored in a computer-readable storage medium is scanned. Based on the scanning, a common analysis is performed on the file for two or more software functions. Based on the scanning, a software function-specific analysis is performed on the file for a respective software function. Two or more decisions on the file is made for the two or more software functions based on the common analysis and the software function-specific analysis.

18 Claims, 8 Drawing Sheets

(56) References Cited

U.S. PATENT DOCUMENTS

| | | | |
|---|---|---|---|
| 2017/0185799 A1 | 6/2017 | Zheng | |
| 2019/0007434 A1* | 1/2019 | McLane | G06N 3/084 |
| 2019/0377875 A1* | 12/2019 | Hashimoto | G06F 21/564 |
| 2020/0019606 A1 | 1/2020 | Ren | |
| 2020/0151333 A1* | 5/2020 | Tomiyasu | G06F 3/128 |

FOREIGN PATENT DOCUMENTS

| | | |
|---|---|---|
| EP | 1883023 A1 | 1/2008 |
| EP | 3543883 A1 | 9/2019 |
| WO | 1992/015067 A1 | 9/1992 |

OTHER PUBLICATIONS

Boyer-Moore string-search algorithm, Jun. 12, 2018; https://en.wikipedia.org/wiki/Boyer-Moore_string-search_algorithm (retrieved from internet on Jul. 3, 2018).

Boyer-Moore-Horspool algorithm, en.wikipedia.org, Sep. 10, 2017, https://en.wikipedia.org/wiki/Boyer-Moore-Horspool_algorithm (retrieved from internet on Jul. 3, 2018).

International Search Report and the Written Opinion dated Mar. 22, 2019, issued in International Application No. PCT/US2018/067915 (7 pages).

Yu et al., "Fast and memory-efficient regular expression matching for deep packet inspection", ANCS '06, Dec. 3-5, 2006, San Jose, California, Proceedings of the 2006 ACM/IEEE Symposium on Architecture for networking and communications systems (10 pages).

Notice of Allowance dated Nov. 4, 2020, issued in related U.S. Appl. No. 16/031,437 (10 pages).

Final Office Action dated Jun. 15, 2020, issued in related U.S. Appl. No. 16/031,437 (15 pages).

Non-Final Office Action dated Feb. 25, 2020, issued in related U.S. Appl. No. 16/031,437 (14 pages).

Non-Final Office Action dated Jul. 17, 2019, issued in related U.S. Appl. No. 16/031,437 (11 pages).

PCT International Search Report and the Written Opinion dated Mar. 5, 2021, issued in related International Application No. PCT/CN2020/136879 (9 pages).

* cited by examiner

MULTI-PURPOSE AGENT FOR ENDPOINT SCANNING

TECHNICAL FIELD

The disclosure relates generally to scanning files of a computer-readable medium for software functions.

BACKGROUND

Software products have been used to manage files, including sorting, searching and protecting files. Example software products include anti-virus software, endpoint data loss prevention, digital data forensic analysis, electronic discovery (eDiscovery), etc. Each of those software functions requires a user computing device (an endpoint) to traverse all or specific directories in the file system. In general, each product has a software agent installed at a user mode. Also, each software product may be provided by a different vendor. Often, when two software functions/agents are provided by the same vendor, they may be developed by different product groups. Even when a vendor may integrate two software functions into one, the integrated agent still traverses the directories twice for the two software functions.

SUMMARY

One aspect of the present disclosure is directed to a method for scanning files for multiple software functions. The method includes scanning a file stored in a computer-readable storage medium. Based on the scanning, a common analysis is performed on the file for two or more software functions. Based on the scanning, a software function-specific analysis is performed on the file for a respective software function. Two or more decisions on the file is made for the two or more software functions based on the common analysis and the software function-specific analysis.

In some embodiments, the common analysis includes one of file type recognition, file content extraction, unpacking the file, unzipping the file, and file content matching with content of a library.

In some embodiments, the method further includes identifying a plurality of root folders for scanning; determining whether a respective root folder includes a sub-folder or the file by traversing each of the root folders recursively; in response to determining that the respective root folder includes a sub-folder, traversing the sub-folder recursively; and in response to determining that the respective root folder includes the file, scanning the file.

In some embodiments, performing the common analysis or the software function-specific analysis on the file includes generating a file fingerprint for the file.

In some embodiments, the file fingerprint for the file is generated by: obtaining a string of characters of the file; obtaining a first sequence of the string of characters; generating a first hash based on the first sequence; obtaining a second sequence of the string of characters, the second sequence being shifted from the first sequence; generating a second hash based on the second sequence; and generating the file fingerprint for the file based on the first hash and the second hash.

In some embodiments, the first sequence and the second sequence are shifted from each other by a predetermined length of characters. In some embodiments, a same hash function is used to generate the first hash and the second hash.

In some embodiments, performing the common analysis or the software function-specific analysis on the file includes calculating a similarity value from the file fingerprint and a reference file fingerprint; determining whether the similarity value is greater than a predetermined threshold; and in response determining that the similarity value is greater than the predetermined threshold, generating a result for a respective software function.

In yet another aspect, an apparatus is provided. The apparatus includes one or more processors, and a memory configured to store instructions executable by the one or more processors. The one or more processors are configured to execute the instructions to perform operations including: scanning a file stored in a computer-readable storage medium; based on the scanning, performing a common analysis on the file for two or more software functions; based on the scanning, performing a software function-specific analysis on the file for a respective software function; and making two or more decisions on the file for the two or more software functions based on the common analysis and the software function-specific analysis.

In yet another aspect, a non-transitory computer-readable storage medium is provided. The non-transitory computer-readable storage medium stores instructions that, when executed by one or more processors, cause the one or more processors to perform operations including: scanning a file stored in a computer-readable storage medium; based on the scanning, performing a common analysis on the file for two or more software functions; based on the scanning, performing a software function-specific analysis on the file for a respective software function; and making two or more decisions on the file for the two or more software functions based on the common analysis and the software function-specific analysis.

These and other features of the apparatuses, systems, methods, and non-transitory computer readable media disclosed herein, as well as the methods of operation and functions of the related elements of structure, will become more apparent upon consideration of the following description and the appended claims with reference to the accompanying drawings, all of which form a part of this specification. It is to be expressly understood, however, that the drawings are for purposes of illustration and description only and are not intended as a definition of the limits of the disclosure. It is to be understood that the foregoing general description and the following detailed description are exemplary and explanatory only, and are not restrictive of the disclosure, as claimed.

BRIEF DESCRIPTION OF THE DRAWINGS

Non-limiting embodiments of the disclosure may be more readily understood by referring to the accompanying drawings in which.

DETAILED DESCRIPTION OF THE EMBODIMENTS

Non-limiting embodiments of the present disclosure will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present disclosure. Various changes and modifications obvious to one skilled in the art to which the present disclosure pertains are deemed to be within the spirit, scope and contemplation of the present disclosure as further defined in the appended claims.

An endpoint device may be provided with multiple software functions to manage its files. Each of the software functions needs to scan/traverse all or portion of the files associated with the endpoint device to make a decision for a respective software function. For example, when an anti-virus software is employed to protect the endpoint from malicious software attacks, the anti-virus software may periodically engage its scanning module to scan the file system of the endpoint device. When another software function, e.g., eDiscovery, is invoked, that software function begins a new scan of the entire file system for its own purpose. Thus, a file may be scanned multiple times for multiple software functions.

Techniques disclosed herein enable a file to be scanned once for making multiple decisions for multiple software functions, such as anti-virus, endpoint data loss prevention, digital data forensic analysis, and eDiscovery. For example, an anti-virus software function may perform scanning of files for file type recognition, file content extraction, unpacking files, unzipping files, a static file content inspection, and a dynamic file content inspection. A static file content inspection may include subsequence matching, string matching, and malware signature matching. In some instances, the string matching may be performed by exact string matching or regular expression (RegEx) matching. Each file is scanned at least once for these operations to enable the anti-virus software function to make a decision on the file, for example, whether the file is infected with malicious software.

A data loss prevention software function may scan files for file type recognition, file content extraction, unpacking files, unzipping files, language recognition, file metadata matching, a static file content inspection, and a dynamic file content inspection. A static file content inspection for a data loss prevention software function may include string matching and file fingerprint matching. In some instances, the string matching may be performed by exact string matching or RegEx matching. Each file is scanned at least once for these operations to enable the data loss prevention software function to make a decision on the file, for example, whether the file is allowed to be transferred to outside of an entity.

Further, a digital-data forensic analysis software function may scan files for file type recognition, file content extraction, unpacking files, unzipping files, file metadata matching, a static file content inspection, and a dynamic file content inspection. A static file content inspection for a digital-data forensic analysis software function may include subsequence matching, string matching, and hash matching. In some instances, the string matching may be performed by exact string matching or RegEx matching. In some instances, the hash matching may include file fingerprint matching and application signature matching. Each file is scanned at least once for these operations to enable the digital-data forensic analysis software function to make a decision on the file, for example, whether the file contains forensic evidence for a security breach.

An eDiscovery software function may scan files for file type recognition, file content extraction, unpacking files, unzipping files, language recognition, file metadata matching, a static file content inspection, and a dynamic file content inspection. A static file content inspection for a digital-data forensic analysis software function may include string matching and file fingerprint matching. In some instances, the string matching may be performed by exact string matching or RegEx matching. Each file is scanned at least once for these operations to enable the eDiscovery software function to make a decision on the file, for example, how the file should be categorized or whether file is relevant to a discoverable subject matter.

Figure 1:
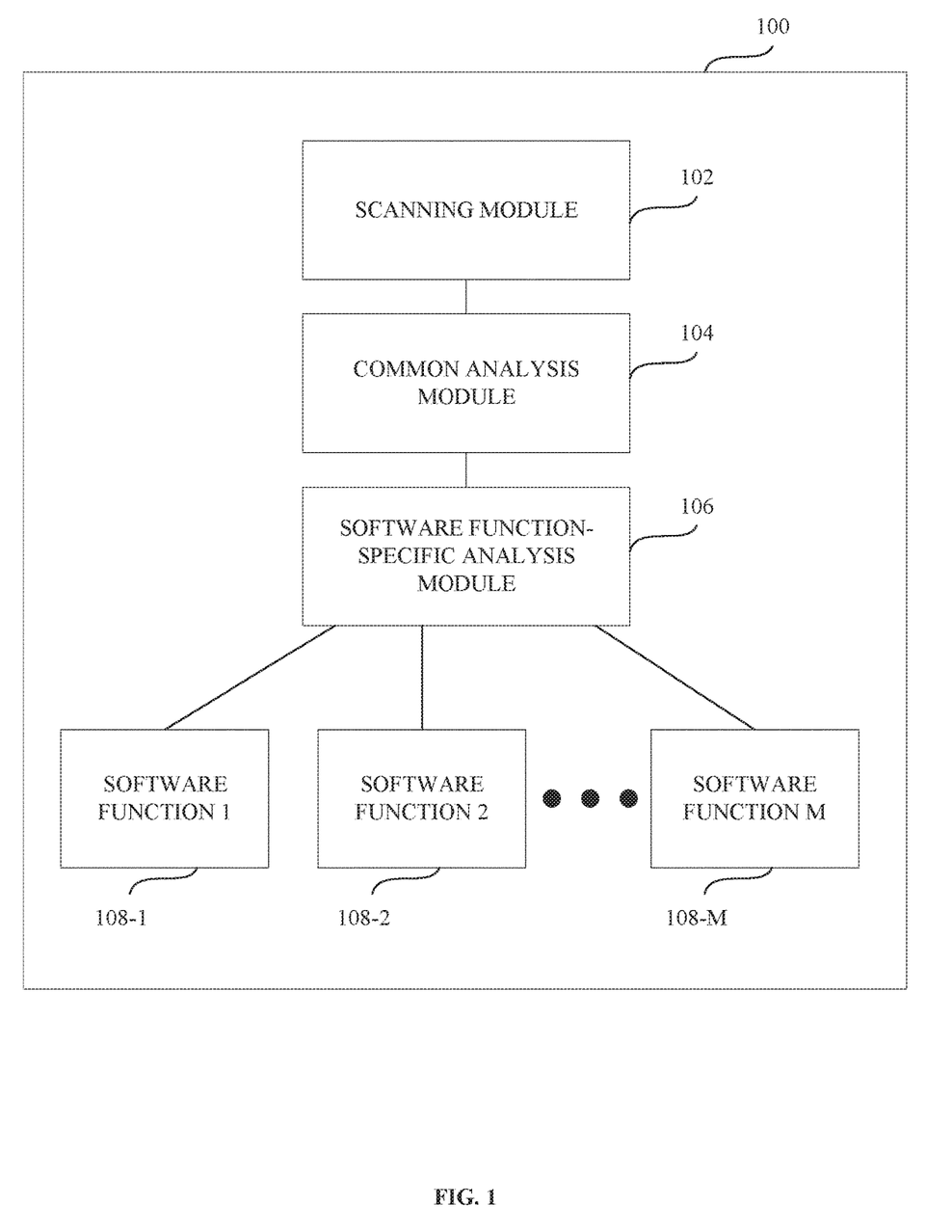
FIG. 1 is a block diagram illustrating a file scanning system according to one example embodiment.

Reference is made to FIG. 1. FIG. 1 is a block diagram illustrating a file scanning system 100 according to one example embodiment. The file scanning system 100 includes a scanning module 102, a common analysis module 104, a software function-specific analysis module 106, and a plurality of software functions 108 including software function 1 (108-1), software function 2 (108-2) . . . software function M (108-M).

When the file scanning system 100 is invoked at an endpoint device, the scanning module 102 is configured to traverse the files associated with the endpoint device. For example, the endpoint device may include a computer-readable storage medium that stores the files. The files may be stored in the computer-readable storage medium in different directories including root folders and sub-folders under the root folders. The scanning module 102 may be configured to scan all or a predetermined portion of the files in the computer-readable storage medium. For example, the scanning module 102 identifies a plurality of root folders for scanning. The scanning module 102 then traverses each of the root folders recursively to determine whether a respective root folder includes a sub-folder or files. In response to determining that the respective root folder includes a sub-folder, the scanning module 102 traverses the sub-folder recursively. In response to determining that the respective root folder includes the file, the scanning module 102 scans the file. After a file is scanned once, the common analysis module 104 is configured to perform a common analysis on the file for two or more software functions. A common analysis on the file involves analyzing a feature for two or more software functions or a subset of all software functions of the endpoint device.

For example, the software functions of anti-virus, endpoint data loss prevention, digital data forensic analysis, and eDiscovery need to analyze the type of the file (e.g., word, PDF, text, picture, etc.), unpack and unzip the file, extract the content of the file, and/or match a string of content of the file to make a decision for their respective purposes. For example, while recognizing a language written in the file may provide insights for the data loss prevention and eDiscovery software functions, it is not required for the software functions of anti-virus and digital data forensic analysis. Thus, the common analysis module 104 can perform language recognition for the data loss prevention and eDiscovery software functions. In some embodiments, the common analysis module 104 can perform subsequence matching and dynamic file content inspection for the software functions of anti-virus and digital data forensic analysis as the insights/results from the subsequence matching and the dynamic file content inspection are useful for those software functions to make a decision for their individual purposes. In some embodiments, the common analysis module 104 can perform file meta data matching and file fingerprint matching for the data loss prevention, eDiscovery, and forensic analysis software functions.

In generally, the common analysis module 104 is called to perform analyses common to the software functions. The techniques allow the file to be scanned once for multiple software functions such that the file is not scanned/traversed multiple times (e.g., once for each software function). This improves the efficiency of the software functions collectively, reduces resources needed for calculations, and improve the performance of the software functions.

Based on the scan, the software function-specific analysis module 106 is invoked to perform a software function-specific analysis on the file for a respective software function. In general, the software function-specific analysis module 106 is configured to analyze the file for no more than one particular software function. For example, the software function-specific analysis module 106 may be called to identify a malware signature for the anti-virus software function. This operation helps the anti-virus software function to make a decision for its purposes, but is not useful for other software functions. Similarly, the software function-specific analysis module 106 may be called to identify an application signature for the digital data forensic analysis software function. As such, the software function-specific analysis module 106 may be configured to perform independent analysis for a respective software function. It should be understood that the analyses can be performed by the common analysis module 104 and the software function-specific analysis module 106 in series or in parallel. There is no particular order in which the analyses should be conducted.

Based on the common analysis and the software function-specific analysis, the file scanning system 100 can make two or more decisions on the file for the two or more software functions with one scan on the file. For example, based on the insights/results learned by the common analysis module 104 and the software function-specific analysis module 106, the anti-virus software function can determine whether the file has been infected with virus. The learned insights also enable the data loss prevention software function to determine whether the file is confidential and should not be transferred outside a predetermined domain, enable the digital data forensic analysis software function to determine whether the file is linked to a security breach, and enable the eDiscovery software function to determine to which category or categories the file should belong. The techniques allow two or more software functions to make decisions for their own purposes based on one scan of the file. This improves the performance of the file scanning system 100 and reduce resources used to complete the software functions.

In some embodiments, the file scanning system 100 is configured to use file fingerprints to facilitate the common analysis and the software function-specific analysis. In some embodiments, the file scanning system 100 detects that a file is a text document or converts a file into a text document. For example, the file scanning system 100 may include one or more application programming interfaces (APIs) that can recognize written languages of the text in the file. The file scanning system 100 can also include a software tool or API (file type recognizer) that can recognize the true type of a text document by its content in addition to by the file name extension. The file scanning system 100 can also include a software tool or APIs (file converter) that can extract textual content from a formatted document such as PDF. For example, the extracted text can be encoded in UTF-8 so that the written languages in the document can be processed. The file converter may be integrated with a file type recognizer. Example tools may include dtSearch and KeyView.

A file may be a text document. A text document may refer to a collection of data or information stored in one unit. Data or information may be stored as text of the text document. For example, a text document may include an electronic document. A text document may be identified by one or more text document identifiers, such as a text document name or a text document fingerprint. A text document may include multiple characters. A character may refer to a symbol having one or more meanings, such as a symbol forming part of a word, depicting a letter, depicting a numeral, expressing grammatical punctuation, representing mathematical concepts, or representing other information. A character may be selected from letters of a set of letters, numerals of a numbering system, or special symbols (e.g., ampersand symbol "&," percent symbol "%," assign "@"). A string of characters may refer to a sequence of characters. A string of characters may include contiguous characters within a text document. The characters/strings of characters within the text document may form text of the text document. Text of the text document may refer to written, printed, or recorded information of the text document. Text of the text document may include visual representation of information included in the text document. A string of characters (T) may have a length (L) and may include characters (c). A string of characters may be written as $T=c_1 c_2 \ldots c_L$.

Obtaining a string of characters may include one or more of accessing, acquiring, analyzing, determining, examining, identifying, loading, locating, opening, receiving, retrieving, reviewing, storing, or otherwise obtaining the string of characters.

In some embodiments, obtaining a string of characters within a text document may include: obtaining the text document; extracting the text of the text document; and normalizing the extracted text of the text document. The file scanning system 100 may extract the text of the text document and normalize the extracted text of the text document. The string of characters may be selected from the normalized text of the text document. Such process for obtaining strings of characters may enable the file scanning system 100 to generate one or more text document fingerprints or file fingerprints for different types of text documents. For example, text documents may store information using different formats (e.g., documents of different formats) and the file scanning system 100 may normalize text extracted from the text documents. For example, the file scanning system 100 may obtain documents of different types (Word document, PDF document, PowerPoint document), extract text of the documents, and normalize the text extracted from the documents as sequences of UTF-8 characters. Such process may result in the file scanning system 100 obtaining standardized strings of characters from text documents that have text encoded differently.

The file scanning system 100 is configured to select multiple sequences from the string of characters. Multiple sequences may be selected from the string of characters to be used in generating a text document fingerprint. A sequence may refer to a portion of a string of characters. A sequence may include contiguous characters within a string of characters. Multiple sequences that are selected from the string of characters may be related to each other. For example, the file scanning system 100 may select a first sequence from the string of characters and then select a second sequence from the string of characters based on the first sequence. The second sequence may be shifted from the first sequence. At least a portion of the second sequence may overlap with the first sequence. These sequences may be used to generate a text document fingerprint which is unique and robust (resilient to change) so that the text document fingerprint may uniquely identify the text document.

Such selection of multiple sequences from the string of characters may facilitate fast generation of text document fingerprints with low probability of collisions. Use of a single sequence of characters from a text document to generate a text document fingerprint may result in multiple text documents sharing the same text document fingerprint. To reduce the probability of collisions, a single sequence of characters from a text document may be processed using multiple functions, such as different hash functions, to generate information for the text document fingerprint. However, use of multiple functions (e.g., different hash functions) may increase computation times to generate text document fingerprints.

The selection of multiple sequences where one of the sequences is shifted from another sequence enables generation of unique and robust fingerprints. For instance, the first sequence may be selected from the string of characters by using a hash function on one or more sequences of the string. The sequence of the string that results in the hash of the sequence equaling O mod p (h=O mod p) may be selected as the first sequence. The second sequence may be selected by shifting away from the first sequence in the forward or reverse direction by a certain number of characters. For example, the second sequence may be selected from the first sequence by shifting away from the first sequence in the forward or reverse direction by a predetermined character such as one or two characters. Such selection of the second sequence may allow for use of an iterative formula to quickly generate unique and robust text document fingerprints. Other selection of the first sequence from the string of characters are contemplated.

The file scanning system 100 may be configured to generate hashes based on the multiple sequences from the string of characters. For example, the file scanning system 100 may generate a first hash based on the first sequence and generate a second hash based on the second sequence. The file scanning system 100 may generate hashes using the same hash function, such as a rolling hash. The use of a rolling hash may enable quick calculations of hash as a prior calculation of the hash may be reused in a subsequent calculation of the hash. For example, the file scanning system 100 may generate the first hash by performing a first calculation of a hash function based on characters within the first sequence. The file scanning system 100 may generate the second hash by performing a second calculation of the same hash function based on characters within the second sequence. The file scanning system 100 may reuse a portion of the first calculation of the hash function in performing the second calculation of the hash function.

The length (w) of the sliding window of the rolling hash may be set or predefined. The hash function, such as the Karp-Rabin function, may be written as $h_w(x_1, x_2, \ldots, x_w) = x_1 b^{w-1} + x_2 b^{w-2} + \ldots + x_{w-1} b + x_w$. This may be an iterative formula with only two additions and two multiplications where $(b_{w-1})$ is a constant. For example, for k=2 to L−w+1, $h_k$ may be calculated from $h_{k-1}$ with the iterative formula. That is, $h_{k-1}$ may be used when calculating $h_k$ by the iterative formula. The values of b and p may be set/predefined, such as p=1021 and b=2. Use of other values and other hash functions, such as Adler-32, are contemplated.

Such generation of hashes using the same hash function for sequences that are shifted from each other may generate unique values for a text document fingerprint. Rather than using two separate hash functions to generate values for a text document fingerprint, the same hash function may be used to iteratively generate values for the text document fingerprint. The shifting of sequences provides for unique generation of hash to avoid collision while allowing prior calculation of hash to be reused in new calculation of hash.

The file scanning system 100 is configured to generate one or more fingerprints for the text document based on hashes of the multiple sequences, such as the first hash and the second hash. For example, the file scanning system 100 may initialize a hash list and add one or more of the hash values calculated for the selected sequences to the hash list. For example, based on $h_k$=O mod p, the file scanning system 100 may add $h_{k-2}$ to the hash list (based on the second sequence being shifted from the first sequence by two characters in the reverse direction). The calculations for $h_k$ and $h_{k-1}$ may be stored for reuse in new hash calculation, and the value for $h_{k-2}$ may be discarded. In some embodiments, other information relating to the selected sequences or the hashes may be used in generating the fingerprint for the text document. For instance, in addition to adding $h_{k-2}$ to the hash list, k−2 may be added to the hash list (e.g., appending <$h_{k-2}$, k−2> to the hash list). The hash list may form the fingerprint for the text document. The hash list may be used to generate the fingerprint for the text document.

Figure 2:
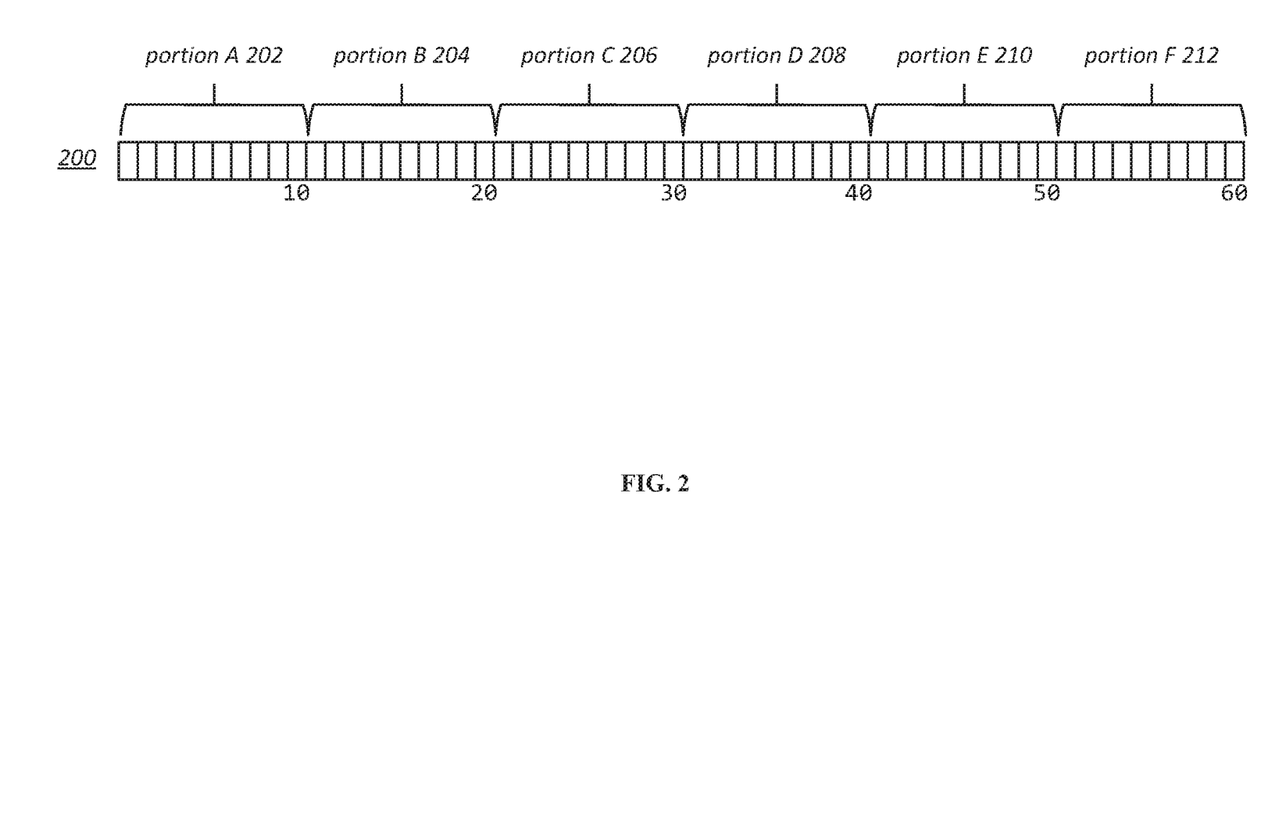
FIG. 2 illustrates an example string of characters and example string portions according to one example embodiment.

FIG. 2 illustrates an example string of characters 200 and example string portions 202, 204, 206, 208, 210, 212, in accordance with various embodiments of the disclosure. One or more sequences of characters may be selected from the string of characters 200 for use in generating file fingerprints. For example, the string of characters 200 may be divided into the string portions A (202), B (204), C (206), D (208), E (210), F (212). The string portions 202, 204, 206, 208, 210, 212 may individually comprise k-grams, where a k-gram comprises a sequence of k-characters (contiguous characters) from the string of characters 200. One of the string portions 202, 204, 206, 208, 210, 212 may be selected as a first string portion to be used in generating file fingerprints. The first string portion may include a first sequence of k-characters from the string of characters 200. For example, the string portion that includes a sequence of k-characters that result in hash equaling O mod p may be selected. Other selections of the first string portion are contemplated.

A second sequence may be selected based on the first sequence. The second string portion may include a second sequence of k-characters from the string of characters 200. The second sequence of k-characters may be selected by shifting from the first sequence of k-characters by n-characters. For example, the second sequence of k-characters may be selected by shifting from the first sequence of k-characters by one or two characters in a reverse direction (towards the start of the string of characters 200) or by shifting from the first sequence of k-characters by one or two characters in a forward direction (towards the end of the string of characters 200).

Figure 3A:
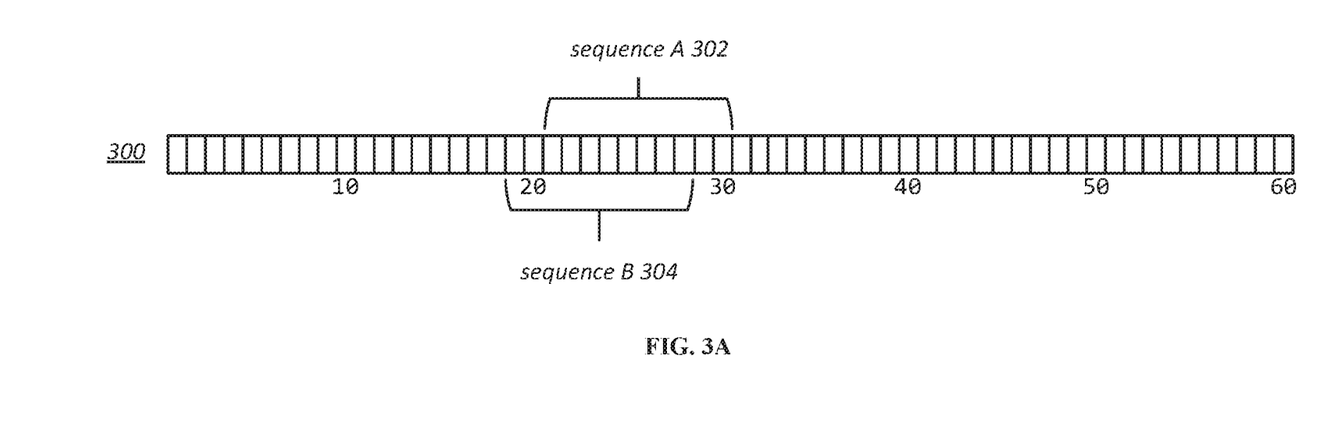
FIG. 3A illustrates example selection of sequences from a string of characters according to one example embodiment.
Figure 3B:
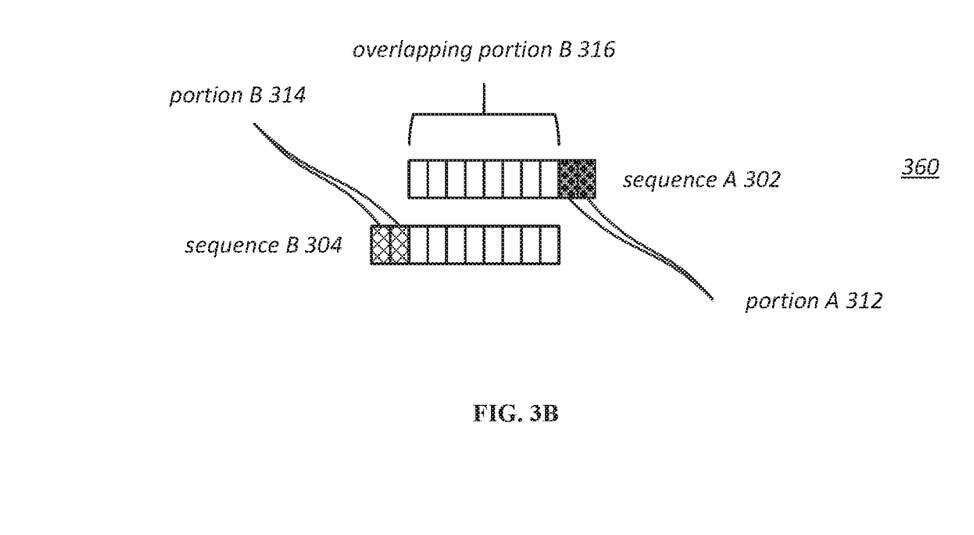
FIG. 3B illustrates example portions of sequences according to one example embodiment.

FIG. 3A illustrates example selection of sequences A (302), B (304) from a string of characters 300, in accordance with various embodiments of the disclosure. For example, the sequence 302 may be selected from the string of characters 300 as a first sequence in generating values for text document fingerprints. The sequence 302 may include ten contiguous characters within the string of characters 300. A first hash may be generated based on the sequence A 302. The generation of the first hash may include a first calculation of a hash function based on the characters within the sequence 302. The sequence 304 may be selected from the string of characters 300 as a second sequence in generating values for text document fingerprints. The sequence 304 may include ten contiguous characters within the string of characters 300. The sequence 304 may be selected by shifting from the sequence 302 by two characters in the reverse direction. A second hash may be generated based on the sequence 304. The generation of the second hash may include a second calculation of the hash function based on the characters within the sequence 304. The second calculation of the hash function may reuse a portion of the first calculation of the hash function FIG. 3B illustrates example portions A (312), B (314), C (316) of the sequences 302, 304, in accordance with various embodiments of the disclosure. The sequence 302 includes the portion 312, which includes two characters at the end of the sequence 302. The two characters in the portion 312 are not included in the sequence 304. The sequence 304 includes the portion 314, which includes two characters at the start of the sequence 304. The two characters in the portion 314 are not included in the sequence 302. The sequence 302 and the sequence 304 both include the overlapping portion 316, which includes eight characters that are in both sequences 302, 304. The calculation of a hash function based on the sequence 302 may reuse a portion of the calculation of the hash function based on the sequence 304. That is, calculation of the hash function based on the sequence 302 may reuse the computation of the hash function using the characters within the overlapping portion 316. For instance, the calculation of the hash function based on the sequence 302 may take the prior calculation of the hash function based on the sequence 304, remove the contribution of the characters within the portion 314 from the prior calculation, and add to the prior calculation the construction of the characters within the portion 312.

Referring back to FIG. 1, in some embodiments, the common analysis module 104 may be configured to perform file fingerprint matching for the software functions 108. To that end, the common analysis module 104 is configured to generate one or more file fingerprints for a file. For example, the common analysis module 104 obtains a string of characters of the file and obtains a first sequence of the string of characters. The common analysis module 104 then generates a first hash based on the first sequence. The common analysis module 104 also obtains a second sequence of the string of characters. The second sequence is different and may be shifted from the first sequence. The common analysis module 104 generates a second hash based on the second sequence and generates a file fingerprint for the file based on the first hash and the second hash. It should be understood that these operations may be reiterated to generate more file fingerprints for the file.

Based on the file fingerprint(s), the software functions, such as data loss prevention, eDiscovery, and forensic analysis, may be configured to make a decision on the file for their own purposes. For example, an analysis module (104 or 106) may calculate a similarity value from the file fingerprint of the file and a reference file fingerprint. The analysis module then determines whether the similarity value is greater than a predetermined threshold. In response determining that the similarity value is greater than the predetermined threshold, the analysis module generates a result for the software function(s). For example, based on the file fingerprint analysis result, the data loss prevention software function may be invoked to determine whether a file can be transferred from an endpoint device to outside of a secured domain. The common analysis module 104 or the software function-specific analysis module 106 may be employed to generate one or more file fingerprints for the file. The analysis module(s) then compares the file fingerprint of the file to a reference file fingerprint of a file that is classified as confidential. For example, analysis module(s) can calculate a similarity value from those file fingerprints. When the analysis module(s) determines that the file fingerprint of the file is similar to the file fingerprint of the confidential file (e.g., the similarity value greater than a predetermined threshold), the analysis module(s) determines that the file in question is also confidential. Based on this determination, the data loss prevention software function can block the transmission of the file to outside of the secured domain.

Figure 4:
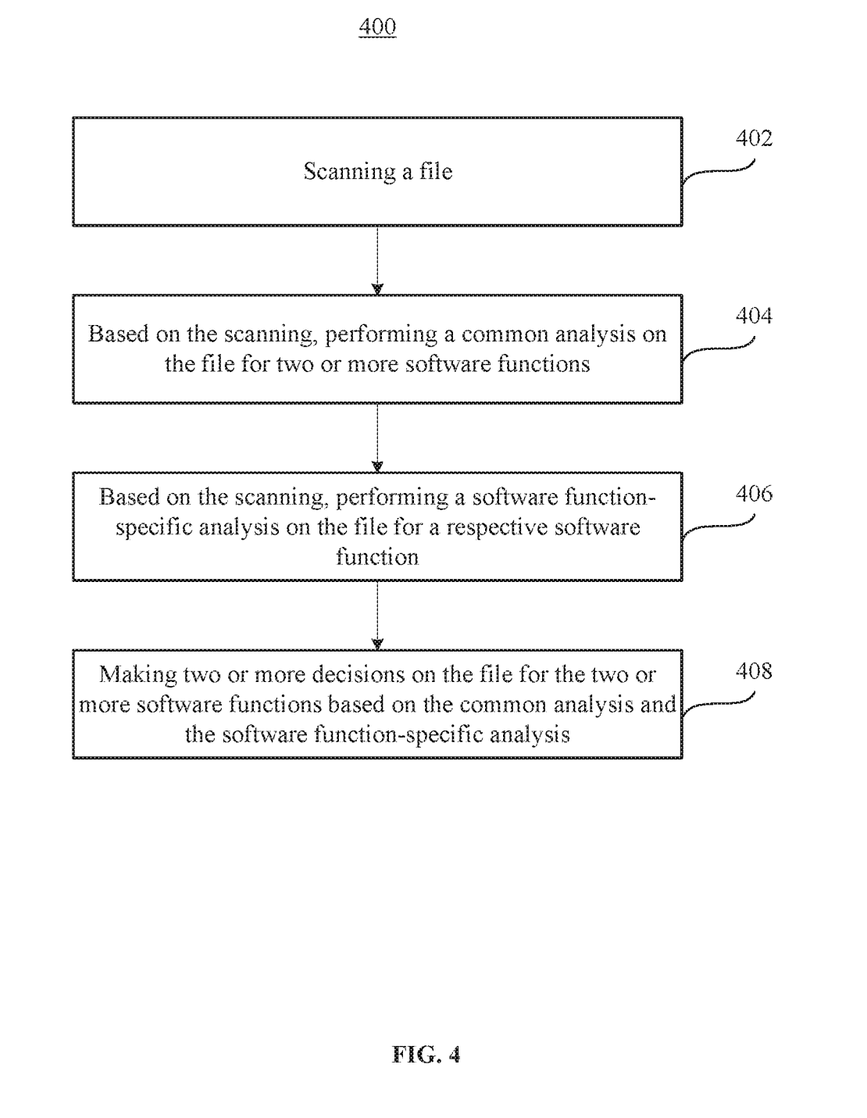
FIG. 4 is a flow chart illustrating a method for performing two or more software functions on a file with a scan, according to one example embodiment.

Reference is now made to FIG. 4. FIG. 4 is a flow chart illustrating a method 400 for performing two or more software functions on a file with one scan, according to one example embodiment. The method 400 may be performed by a file scanning system, such as the file scanning system 100 in FIG. 1, of a computing (endpoint) device. At 402, the file scanning system scans a file. The file may be stored in a computer-readable storage medium associated with the file scanning system. At 404, based on the scanning, the file scanning system performs a common analysis on the file for two or more software functions of the computing device. For example, with one scan on the file, the file scanning system may perform file type recognition, file content extraction, and file unpacking and unzipping, which are analysis processes common to two or more software functions, such as anti-virus, data loss prevention, digital data forensic analysis, and eDiscovery. For example, the file scanning system may invoke a common analysis module to extract the content of the file and match a string of content of the file with a reference string for the software functions to make a decision for their own purposes. In some embodiments, the common analysis module can perform subsequence matching and dynamic file content inspection for the software functions of anti-virus and digital data forensic analysis that are useful for those software functions to make a decision for their individual purposes.

At 406, based on the scanning, the file scanning system performs a software function-specific analysis on the file for a respective software function. In some embodiments, with the same one scan on the file, the file scanning system may identify malware signatures for the anti-virus software function or identify application signatures for the digital data forensic analysis software function. These analyses are unique for the respective software functions and are not useful for other software functions.

At 408, the file scanning system makes two or more decisions on the file for two or more software functions based on the common analysis and the software function-specific analysis. In some embodiments, based on the insights/results learned by the common analysis and the software function-specific analysis, the file scanning system can determine whether the file has been infected with virus for an anti-software software function. Further, based on the insights, the file scanning system determines whether the file is confidential for a data loss prevention software function and should not be transferred outside a predetermined domain, determines whether the file is linked to a security breach for a digital data forensic analysis software function, and determines to which category or categories the file should belong for an eDiscovery software function.

Figure 5:
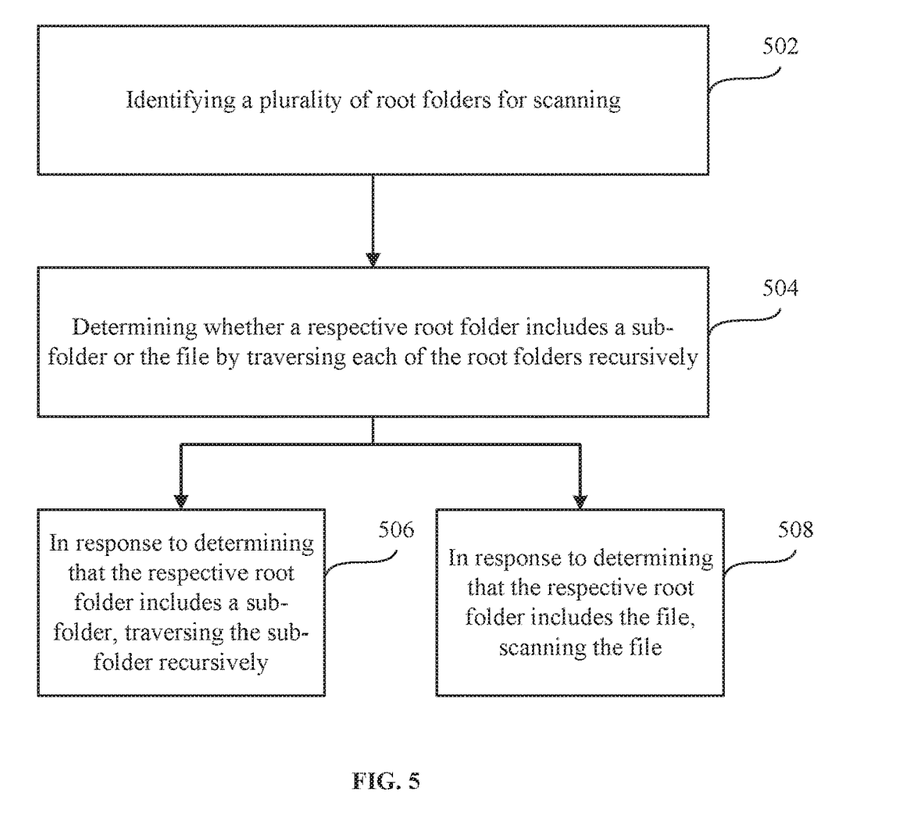
FIG. 5 is a flow chart illustrating a method for scanning files in a file repository, according to one example embodiment.

Reference is now made to FIG. 5. FIG. 5 is a flow chart illustrating a method 500 for scanning files in a file repository, according to one example embodiment. The method 500 may be performed by a file scanning system of a computing (endpoint) device, such as the file scanning system 100 in FIG. 1. At 502, the file scanning system identifies a plurality of root folders for scanning. For example, the file scanning system may be directed to a file directory that includes a plurality of root folders. At 504, the file scanning system traverses each of the root folders recursively to determine whether a respective root folder includes a sub-folder or the file. At 506, in response to determining that the respective root folder includes a sub-folder, the file scanning system traverses the sub-folder recursively. At 508, in response to determining that the respective root folder includes the file, the file scanning system scans the file. These operations may be reiterated until all root folders and sub-folders are traversed, and ensure the file scanning system to thoroughly scan each file in the file repository for two or more software functions.

Figure 6:
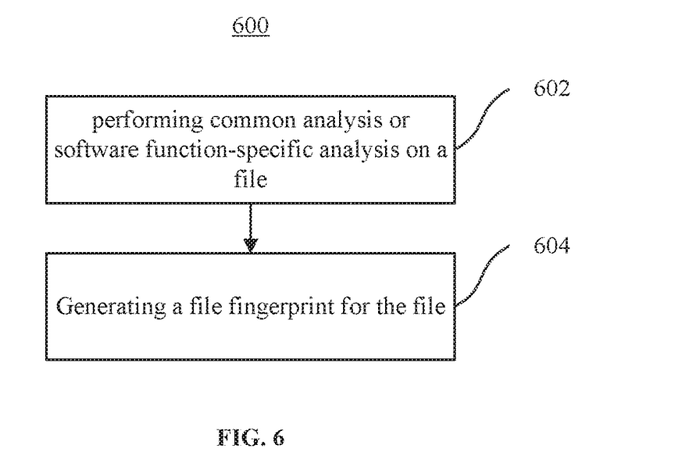
FIG. 6 is a flow chart illustrating a method for performing a common analysis or a software function-specific analysis on a file, according to one example embodiment.

FIG. 6 is a flow chart illustrating a method 600 for performing a common analysis or a software function-specific analysis on a file, according to one example embodiment. The method 600 may be performed by a file scanning system of a computing (endpoint) device, such as the file scanning system 100 in FIG. 1. At 602, the file scanning system performs a common analysis or a software function-specific analysis on the file. For example, the file scanning system may be configured to determine whether a file under analysis is similar to a confidential file for the data loss prevention software function, to a virus-infected file for the anti-virus software function, to a classified file for eDiscovery software function, etc. The file scanning system can use file fingerprint technology for determining file similarity. At 604, the file scanning system generates a file fingerprint for the file. Detail operations for generating a file fingerprint is provided hereinafter.

Figure 7:
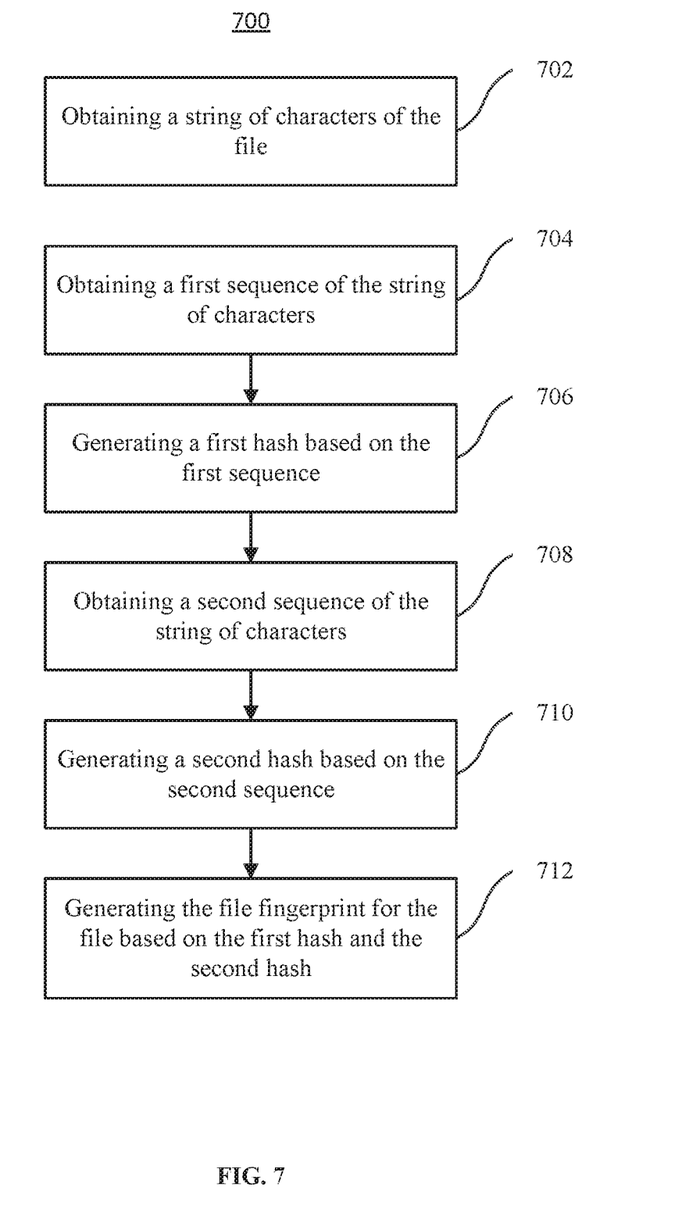
FIG. 7 is a flow chart illustrating a method for generating a file fingerprint for a file, according to one example embodiment.

FIG. 7 is a flow chart illustrating a method 700 for generating a file fingerprint for a file, according to one example embodiment. The method 700 may be performed by a file scanning system of a computing (endpoint) device, such as the file scanning system 100 in FIG. 1. At 702, the file scanning system obtains a string of characters within a file. For example, the file may contain text or have been converted to a text file. The text of the file includes strings of characters. At 704, the file scanning system obtains a first sequence from the string. At 706, the file scanning system generates a first hash based on the first sequence. Generation of the first hash may include a first calculation of a hash function based on characters within the first sequence. At 708, the file scanning system obtains a second sequence from the string. The second sequence may be selected based on the first sequence and shifted from the first sequence. At 710, the file scanning system generates a second hash based on the second sequence. Generation of the second hash may include a second calculation of the hash function based on characters within the second sequence. The second calculation of the hash function may reuse a portion of the first calculation of the hash function. At 712, the file scanning system generates a fingerprint for the file based on the first hash and the second hash. In some embodiments, the file scanning system may employ these operations to generate more fingerprints for the file based on strings of characters of the file.

Figure 8:
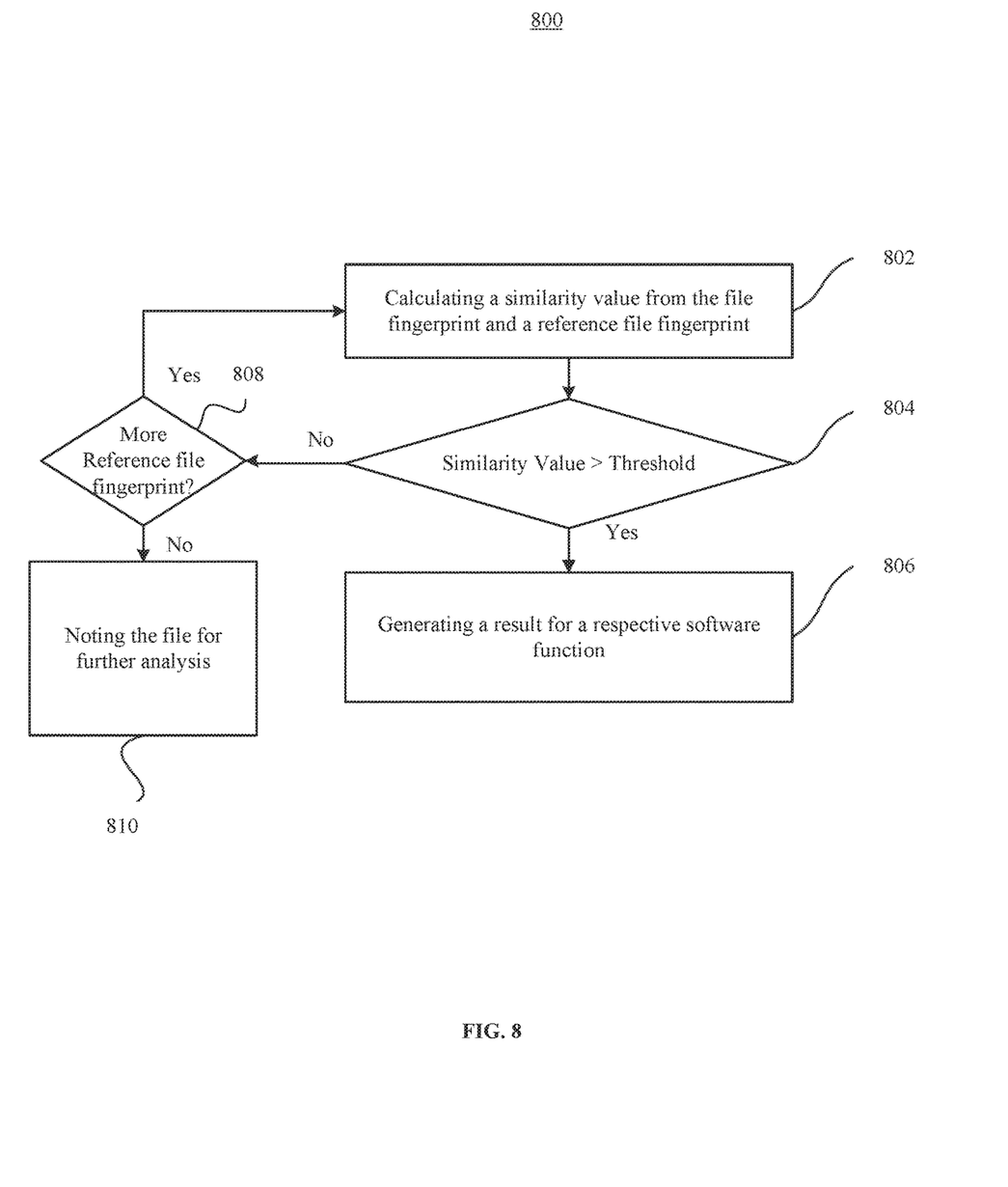
FIG. 8 is a flow chart illustrating a method for using a file fingerprint for a file to generate analysis results for one or more software functions, according to one example embodiment.

FIG. 8 is a flow chart illustrating a method 800 for using a file fingerprint for a file to generate analysis results for one or more software functions, according to one example embodiment. The method 800 may be performed by a file scanning system of a computing (endpoint) device, such as the file scanning system 100 in FIG. 1. At 802, the file scanning system calculates a similarity value from the file fingerprint and a reference file fingerprint. The reference file fingerprint may be a file fingerprint of a particular file that is relevant to the respective software function. For example, an anti-virus software function may desire to know whether the file under analysis is infected with a computer virus. The file scanning system can generate a reference file fingerprint for an infected file and determine whether the file fingerprint of the file under analysis is similar to the file fingerprint of the infected file. Moreover, a data loss prevention software function may need to determine whether a file under analysis is confidential and should not be transferred outside of a secured domain. The file scanning system can generate a reference file fingerprint for a confidential file and determine whether the file fingerprint of the file under analysis is similar to the file fingerprint of the confidential file. The file scanning system may determine two files are similar by calculating a similarity value from their respective file fingerprints.

At 804, the file scanning system determines whether the similarity value is greater than a predetermined threshold. For example, the predetermined threshold may be 50% or more, 60% or more, 70% or more, 80% or more, 90% or more, 95% or more, or 99% or more. When the similarity value is greater than the predetermined threshold, the file scanning system determines that the file under analysis is similar to a reference file for a respective software function. In response determining that the similarity value is greater than the predetermined threshold (Yes at 804), the file scanning system at 806 generates an analysis result for a respective software function. For example, the file scanning system determines that the file under analysis is similar or dissimilar to a reference file. Based on the analysis result, the filing scanning system can make two or more decisions for two or more software functions. For example, an anti-virus software function may utilize the analysis result to determine whether the file under analysis is infected with a computer virus. Moreover, an eDiscovery software function may classify a file under analysis to a particular file category based on the similarity analysis. For example, when the file under analysis is similar to a reference file that has been classified in a particular file category, the eDiscovery software function can classify the file under analysis into the particular file category.

In response determining that the similarity value is not greater than the predetermined threshold (No at 804), the file scanning system at 808 determines whether one or more reference file fingerprints are in queue to be compared with the file fingerprint of the file under analysis. If one or more reference file fingerprints remain in queue to be compared with the file fingerprint of the file under analysis (Yes at 808), the method 800 returns to 802 to calculate more similarity values. If no reference file fingerprints is in queue to be compared with the file fingerprint of the file under analysis (No at 808), at 810 the file scanning system notes the file for further analysis. For example, the file scanning system may return to the similarity analysis once new reference file fingerprints are generated in the system. In some embodiments, the file scanning system may isolate the file under analysis for user intervention. For example, the file scanning system may generate an alert for a user indicating that the file scanning system is unable to make a decision for the software functions.

Figure 9:
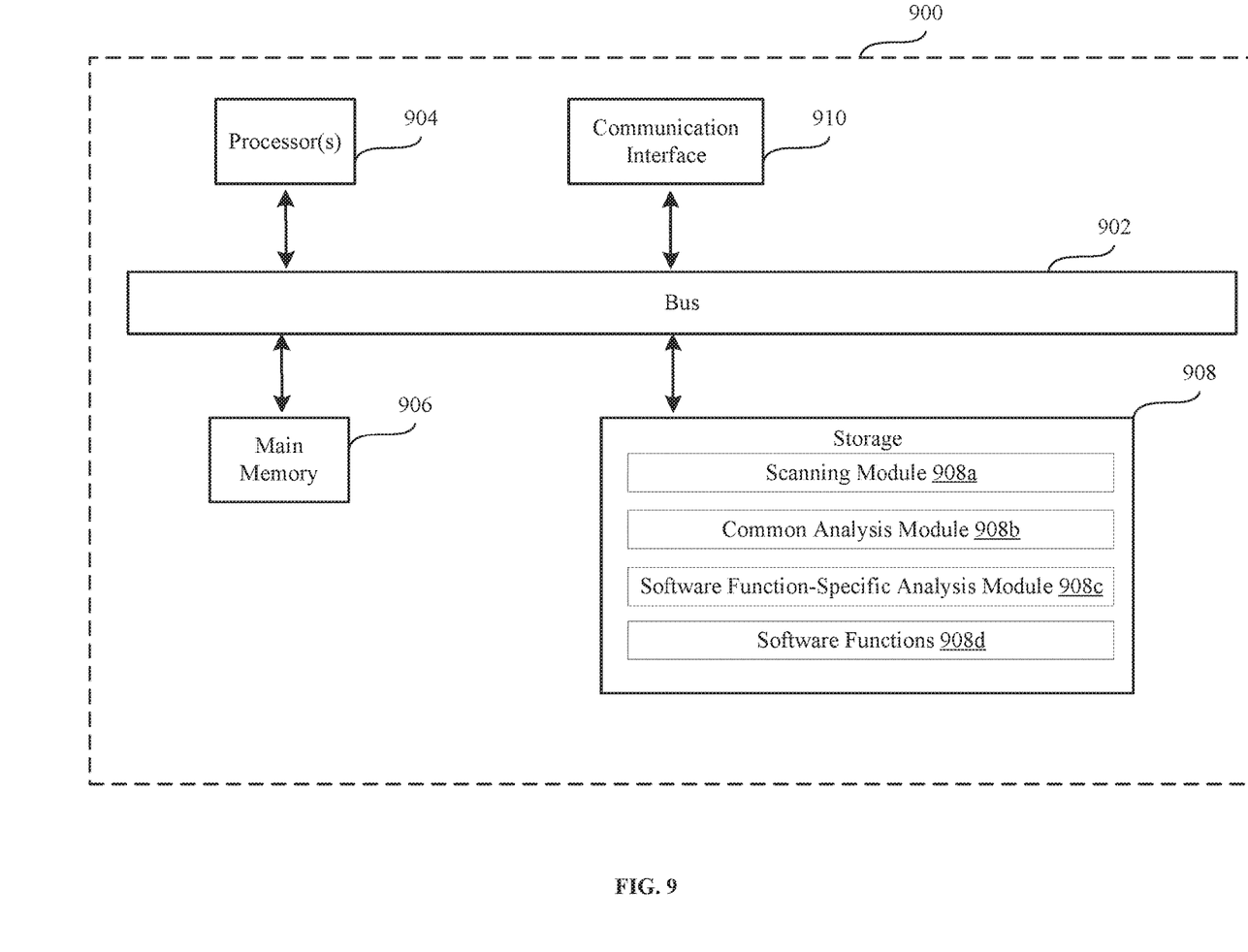
FIG. 9 is a block diagram that illustrates a computer system upon which any of the embodiments described herein may be implemented, according to one example embodiment.

FIG. 9 is a block diagram that illustrates a computer system 900 upon which any of the embodiments described herein may be implemented. For example, the computer system may be an endpoint device that includes a file scanning system. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor(s) 904. Main memory 906 also may be used for storing temporary variables or other intermediate information during execution of instructions to be executed by processor(s) 904. Such instructions, when stored in storage media accessible to processor(s) 904, render computer system 900 into a special-purpose machine that is customized to perform the operations specified in the instructions. Main memory 906 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 900 may implement the techniques described herein using customized hard-wired logic, one or more application-specific integrated circuits (ASICs) or field-programmable gate arrays (FPGAs), firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 908. Execution of the sequences of instructions contained in main memory 906 causes processor(s) 904 to perform the process operations described herein. For example, the processes/methods shown in FIGS. 4-8 and described in connection with this figure can be implemented by computer program instructions stored in main memory 906. When these instructions are executed by processor(s) 904, they may perform the operations as shown in FIGS. 5-8 and described above. In some embodiments, hard-wired circuitry may be used in place of or in combination with software instructions.

The storage device 908 may be a non-transitory storage medium and store various data and software modules for the operations disclosed herein. For example, the storage device 908 may store a scanning module 908a, a common analysis module 908b, a software function-specific analysis module 908c, and a plurality of software functions 908d.

The computer system 900 also includes a communication interface 910 coupled to bus 902. Communication interface 910 provides a two-way data communication coupling to one or more network links that are connected to one or more networks. As another example, communication interface 910 may be a local area network (LAN) card to provide a data communication connection to a compatible local area network (LAN) or wide area network (WAN) component to communicated with a WAN. Wireless links may also be implemented.

The computer system 900 shown in FIG. 9 may be employed as a file scanning system to perform the methods 400, 500, 600, 700, and 800 as shown in FIGS. 4-8.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components/modules. Components may constitute either software components/modules (e.g., code embodied on a machine-readable medium) or hardware components/modules (e.g., a tangible unit capable of performing certain operations which may be configured or arranged in a certain physical manner). For example, each of the operations in FIGS. 4-8 may be performed by a module (software, hardware, or a combination of software and hardware).

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A method comprising:
executing a multi-purpose one-time scanning on a file stored in a computer-readable storage medium, wherein the multi-purpose one-time scanning comprises:
performing a common analysis on the file by:
extracting content of the file to obtain a string of characters of the file;
dividing the string of characters of the file into a plurality of sequences;
generating a plurality of hashes corresponding to the plurality of sequences and aggregating the plurality of hashes into a hash list; and
generating a fingerprint of the file based on the hash list; and performing multiple software function-specific analyses on the file without scanning the file for multiple times, wherein the multiple software function-specific analyses comprises a first analysis and a second analysis, the first analyses comprises determining whether the file is a confidential file by matching the fingerprint of the file with a fingerprint of a reference confidential file, and the second analysis comprises determining whether the file is a virus-infected file by matching the fingerprint of the file with a fingerprint of a reference virus-infected.

2. The method according to claim 1, wherein the common analysis further includes one of file type recognition, file content extraction, unpacking the file, unzipping the file, and file content matching with content of a library.

3. The method according to claim 1, wherein the multi-purpose one-time scanning on the file comprises:
identifying a plurality of root folders for scanning;
traversing each of the root folders recursively to determine whether a respective root folder includes a sub-folder or the file;
in response to determining that the respective root folder includes a sub-folder, traversing the sub-folder recursively; and
in response to determining that the respective root folder includes the file, scanning the file.

4. The method according to claim 1, wherein the generating a plurality of hashes corresponding to the plurality of sequences comprises:
obtaining a first sequence from the plurality of sequences;
generating a first hash based on the first sequence;
obtaining a second sequence from the plurality of sequences, the second sequence being shifted from the first sequence;
generating a second hash based on the second sequence; and
adding the first hash and the second hash into the hash list.

5. The method according to claim 4, wherein the first sequence and the second sequence are shifted from each other by a predetermined length of characters.

6. The method according to claim 4, further comprising:
using a same hash function to generate the first hash and the second hash.

7. An apparatus comprising:
one or more processors;
a memory configured to store instructions executable by the one or more processors, wherein the one or more processors are configured to execute the instructions to perform operations including:
executing a multi-purpose one-time scanning on a file stored in a computer-readable storage medium, wherein the multi-purpose one-time scanning comprises:
performing a common analysis on the file by:
extracting content of the file to obtain a string of characters of the file;
dividing the string of characters of the file into a plurality of sequences;
generating a plurality of hashes corresponding to the plurality of sequences and aggregating the plurality of hashes into a hash list; and
generating a fingerprint of the file based on the hash list; and, performing multiple software function-specific analyses on the file without scanning the file for multiple times, wherein the multiple software function-specific analyses comprises a first analysis and a second analysis, the first analysis comprises determining whether the file is a confidential file by matching the fingerprint of the file with a fingerprint of a reference confidential file, and the second analysis comprises determining whether the file is a virus-infected file by matching the fingerprint of the file with a fingerprint of a reference virus-infected file.

8. The apparatus according to claim 7, wherein the common analysis further includes one of file type recognition, file content extraction, unpacking the file, unzipping the file, and file content matching with content of a library.

9. The apparatus according to claim 7, wherein the multi-purpose one-time scanning on the file comprises:
identifying a plurality of root folders for scanning;
traversing each of the root folders recursively to determine whether a respective root folder includes a sub-folder or the file;
in response to determining that the respective root folder includes a sub-folder, traversing the sub-folder recursively; and
in response to determining that the respective root folder includes the file, scanning the file.

10. The apparatus according to claim 7, wherein the generating a plurality of hashes corresponding to the plurality of sequences comprises:
obtaining a first sequence from the plurality of sequences;
generating a first hash based on the first sequence;
obtaining a second sequence from the plurality of sequences, the second sequence being shifted from the first sequence;
generating a second hash based on the second sequence; and
adding the first hash and the second hash into the hash list.

11. The apparatus according to claim 10, wherein the first sequence and the second sequence are shifted from each other by a predetermined length of characters.

12. The apparatus according to claim 10, further comprising:
using a same hash function to generate the first hash and the second hash.

13. A non-transitory computer-readable storage medium storing instructions that, when executed by one or more processors, cause the one or more processors to perform operations including:

executing a multi-purpose one-time scanning on a file stored in a computer-readable storage medium, wherein the multi-purpose one-time scanning comprises;

performing a common analysis on the file by:

extracting content of the file to obtain a string of characters of the file;

dividing the string of characters of the file into a plurality of sequences;

generating a plurality of hashes corresponding to the plurality of sequences and aggregating the plurality of hashes into a hash list; and generating a fingerprint of the file based on the hash list; and performing multiple software function-specific analyses analysis on the file without scanning the file for multiple times, wherein the multiple software function-specific analyses comprises a first analysis and a second analysis, the first analysis comprises determining whether the file is a confidential file by matching the fingerprint of the file with a fingerprint of a reference confidential file, and the second analysis comprises determining whether the file is a virus- infected file by matching the fingerprint of the file with a fingerprint of a reference virus-infected file.

14. The non-transitory computer-readable storage medium according to claim 13, wherein the common analysis further includes one of file type recognition, file content extraction, unpacking the file, unzipping the file, and file content matching with content of a library.

15. The non-transitory computer-readable storage medium according to claim 13, wherein the multi-purpose one-time scanning on the file comprises:

identifying a plurality of root folders for scanning;

traversing each of the root folders recursively to determine whether a respective root folder includes a sub-folder or the file;

in response to determining that the respective root folder includes a sub-folder, traversing the sub-folder recursively; and in response to determining that the respective root folder includes the file, scanning the file.

16. The non-transitory computer-readable storage medium according to claim 13, wherein the generating a plurality of hashes corresponding to the plurality of sequences comprises:

obtaining a first sequence from the plurality of sequences;

generating a first hash based on the first sequence;

obtaining a second sequence from the plurality of sequences, the second sequence being shifted from the first sequence;

generating a second hash based on the second sequence; and adding the first hash and the second hash into the hash list.

17. The non-transitory computer-readable storage medium according to claim 16, wherein the first sequence and the second sequence are shifted from each other by a predetermined length of characters.

18. The non-transitory computer-readable storage medium according to claim 16, wherein the operations further comprise:

using a same hash function to generate the first hash and the second hash.

* * * * *

UNITED STATES PATENT AND TRADEMARK OFFICE
CERTIFICATE OF CORRECTION

PATENT NO. : 11,250,131 B2  
APPLICATION NO. : 16/720245  
DATED : February 15, 2022  
INVENTOR(S) : Ren et al.

It is certified that error appears in the above-identified patent and that said Letters Patent is hereby corrected as shown below:

In the Claims

In Claim 1, Column 15, Line 24, "analysis and a second analysis, the first analyses" should read -- analysis and a second analysis, the first analysis --.

In Claim 13, Column 17, Line 3, "the multi-purpose one-time scanning comprises;" should read -- the multi-purpose one-time scanning comprises: --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*